(12) United States Patent
Wegelin

(10) Patent No.: US 8,245,879 B2
(45) Date of Patent: Aug. 21, 2012

(54) TOUCH-FREE BIOMETRIC-ENABLED DISPENSER

(75) Inventor: Jackson W. Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 756 days.

(21) Appl. No.: 12/403,455

(22) Filed: Mar. 13, 2009

(65) Prior Publication Data

US 2010/0230435 A1 Sep. 16, 2010

(51) Int. Cl.
*B67D 1/00* (2006.01)
(52) U.S. Cl. .......................................... 222/52; 222/63
(58) Field of Classification Search .......... 222/1, 52–69, 222/207, 214, 325, 333, 321.1, 372; 382/115, 382/116, 181, 190
See application file for complete search history.

(56) References Cited

U.S. PATENT DOCUMENTS

| | | | | |
|---|---|---|---|---|
| 4,722,372 A * | 2/1988 | Hoffman et al. | | 141/98 |
| 4,921,150 A * | 5/1990 | Lagergren et al. | | 222/639 |
| 4,938,384 A * | 7/1990 | Pilolla et al. | | 222/52 |
| 5,255,822 A * | 10/1993 | Mease et al. | | 222/63 |
| 5,960,991 A | 10/1999 | Ophardt | | |
| 6,206,238 B1 * | 3/2001 | Ophardt | | 222/1 |
| 6,209,752 B1 * | 4/2001 | Mitchell et al. | | 222/63 |
| 6,392,546 B1 | 5/2002 | Smith | | |
| 6,793,134 B2 | 9/2004 | Clark | | |
| 7,408,470 B2 | 8/2008 | Wildman | | |
| 7,680,305 B2 * | 3/2010 | Miura et al. | | 382/115 |
| 7,697,730 B2 * | 4/2010 | Okamura et al. | | 382/115 |
| 7,769,209 B2 * | 8/2010 | Komura et al. | | 382/115 |
| 2002/0175182 A1 * | 11/2002 | Matthews | | 222/52 |
| 2002/0185500 A1 | 12/2002 | Muderlak | | |
| 2004/0020984 A1 | 2/2004 | Clark | | |
| 2004/0090333 A1 | 5/2004 | Wildman et al. | | |
| 2005/0133100 A1 | 6/2005 | Bolderheij et al. | | |
| 2005/0282142 A1 | 12/2005 | Lynn | | |

(Continued)

FOREIGN PATENT DOCUMENTS

CA 2496418 A1 8/2006

(Continued)

OTHER PUBLICATIONS

Sony Corporation, "Sony Develops Compact Sized, High Speed, High Accuracy Finger Vein Authentication Technology", Physorg. corn, Feb. 2, 2009, Technology/Engineering.

*Primary Examiner* — Lien Ngo
(74) *Attorney, Agent, or Firm* — Renner, Kenner, Greive, Bobak, Taylor & Weber

(57) ABSTRACT

A touch-free dispenser includes a dispenser controller coupled to a memory unit, which includes a database of previously-stored vein patterns. A vein-pattern sensor maintained by the dispenser images the unique vein pattern of a user's hand without contact. The imaged vein pattern is subsequently compared with stored vein patterns, such that if there is a match, the dispenser proceeds to dispense material, such as soap, from a refill container. Alternatively, if there is no match between the imaged vein pattern and the stored vein patterns, the dispenser enters a learn mode to allow the imaged vein pattern to be added to the database. Data associated with the use of the dispenser is also collected during its operation, which is stored and associated with the imaged vein patterns for subsequent analysis.

26 Claims, 4 Drawing Sheets

U.S. PATENT DOCUMENTS

| | | |
|---|---|---|
| 2006/0213924 A1 | 9/2006 | Ophardt |
| 2006/0231568 A1 | 10/2006 | Lynn |
| 2007/0257803 A1 | 11/2007 | Munro |
| 2008/0019489 A1 | 1/2008 | Lynn |
| 2008/0019490 A1 | 1/2008 | Lynn |
| 2008/0021779 A1 | 1/2008 | Lynn |
| 2008/0103636 A1 | 5/2008 | Glenn |
| 2009/0295539 A1 | 12/2009 | Mahmoodi et al. |
| 2010/0282772 A1* | 11/2010 | Ionidis .............................. 222/1 |

FOREIGN PATENT DOCUMENTS

| | | |
|---|---|---|
| EP | 1903509 A1 | 3/2008 |
| WO | 2005043469 A1 | 5/2005 |
| WO | 2007/133960 A2 | 11/2007 |

* cited by examiner

TOUCH-FREE BIOMETRIC-ENABLED DISPENSER

TECHNICAL FIELD

Generally, the present invention relates to dispensers. Particularly, the present invention relates to a dispenser that is configured to utilize biometrics to identify and track the use of the dispenser. More particularly, the present invention relates to a touch-free dispenser that utilizes vein-pattern recognition to dispense a material without physically contacting the dispenser.

BACKGROUND ART

The importance of cleanliness has long been recognized, particularly in the fields of healthcare, food preparation, and laboratory research. The practice of manual hand scrubbing by surgeons and other operating room personnel defines the epitome of efforts to maintain a sterile environment. Although manual hand washing can be effective, medical experts have concluded that automated hand-washing devices increase hand-washing compliance and, therefore, reduce the risk of infection. Automated hand-washing devices are designed to wash the hands of the user and provide the proper amount of antimicrobial cleanser in a set time. Additionally, these devices diminish the deterrent effects resulting from the friction and irritation associated with frequent manual hand washing.

In addition to automated hand-washing devices, hands-free dispensers, which dispense cleaning material, such as soap, without physically contacting the dispenser, have also been put into use in an effort to decrease microbial contamination between successive users that would normally result in manually-actuated dispensers.

While such automated and hands-free hand-washing devices provide significant benefits over that of manual hand washing, several drawbacks still exist. For example, one difficulty is verifying whether employees and/or staff are actually using the automated hand-washing device in compliance with sanitation standards.

To overcome this drawback, some dispensers utilize hygiene-monitoring systems, which use a variety of devices, such as biometric scanners, RFID tags, and bar codes, to uniquely associate a user with his or her use of the dispenser. For example, hygiene dispensers may utilize a fingerprint reader that identifies each user by his or her unique fingerprint to ascertain user compliance with sanitation standards. However, such monitoring devices require that the user's identity be disclosed prior to the dispensement of the cleansing material, and subsequent usage monitoring, which sacrifices the anonymity of the user. This sacrificed anonymity is not desirable, as it may result in privacy concerns for the users, and the institutions that utilize such dispensers, which are unwanted. Thus, it is desirable to be able to utilize biometric tracking without associating it with a specific individual, while still identifying various trends in the usage habits of the users of the dispenser.

Furthermore, such biometric systems require the user to physically contact the dispenser, which results in the transmission of bacteria, viruses, and other microorganisms between successive individuals. Accordingly, it would be advantageous to have a system that verifies and/or tracks the hand washing of users without the need to physically contact the dispenser to limit the development and spread of harmful bacteria, viruses, and other microorganisms.

Therefore, there is a need for a dispenser that utilizes vein-pattern recognition to identify a user of the dispenser before dispensing of material, such as soap, is performed. In addition, there is a need for a touch-free dispenser that utilizes vein-pattern recognition to associate usage data with a dispensing event with each user of the dispenser. Still yet, there is a need for a touch-free dispenser that utilizes vein-pattern recognition to initiate one or more functions of the dispenser without physically contacting the dispenser. Furthermore, there is a need for a touch-free dispenser that does not associate a user's vein pattern with his or her identity.

SUMMARY OF INVENTION

In light of the foregoing, it is a first aspect of the present invention to provide touch-free biometric-enabled dispenser.

It is another aspect of the present invention to provide a touch-free dispenser for dispensing material from a refill container into a user's hand comprising a controller; a pump coupled to said controller, said pump configured to receive the material from the refill container; a local memory unit coupled to said controller, said local memory unit adapted to maintain at least one vein pattern; and a vein-pattern sensor coupled to said controller, said vein-pattern sensor configured to detect at least a portion of the vein pattern of the user's hand, wherein said controller activates said pump to dispense the material from the refill container when said vein-pattern sensor detects said at least portion of said vein pattern of said user's hand.

Yet another aspect of the present invention is to provide a touch-free dispenser for dispensing material from a refill container into a user's hand comprising a controller; a pump coupled to said controller, said pump configured to receive the material from the refill container; and a vein-pattern sensor coupled to said controller, wherein said controller activates said pump to dispense the material from the refill container if said vein-pattern sensor detects at least a portion of a vein pattern in the user's hand.

Still another aspect of the present invention to provide a method of dispensing material in a touch-free manner comprising providing a dispenser having a vein-pattern sensor; coupling a refill container in operative communication with said dispenser, said refill container maintaining a quantity of material; placing at least one hand in proximity to said vein-pattern sensor, such that placement of the user's hand activates the vein-pattern sensor; and dispensing said material from said refill container if a vein pattern is detected at said determining step.

Yet another aspect of the present invention is to provide a touch-free dispenser for dispensing material into a user's hand comprising a controller; a pump coupled to said controller, said pump configured to receive the material from the dispenser; and a biometric sensor coupled to said controller to detect a biometric measure in the user's hand without contact thereto, wherein said controller activates said pump to dispense the material from the dispenser if said biometric sensor detects a biometric measure in the user's hand.

Still another aspect of the present invention is to provide a dispenser for dispensing material from a refill container into a user's hand comprising a controller; a biometric sensor coupled to said controller, said biometric sensor configured to detect a biometric measure in the user's hand; and a pump coupled to said controller, said pump configured to receive the material from the refill container so as to dispense the material when said biometric sensor senses the biometric measure in the user's hand, regardless of whether said biometric sensor has previously sensed the biometric measure of the same user's hand, and further wherein said biometric measure is maintained by said controller anonymously, such that it is not associated with the user's identity.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
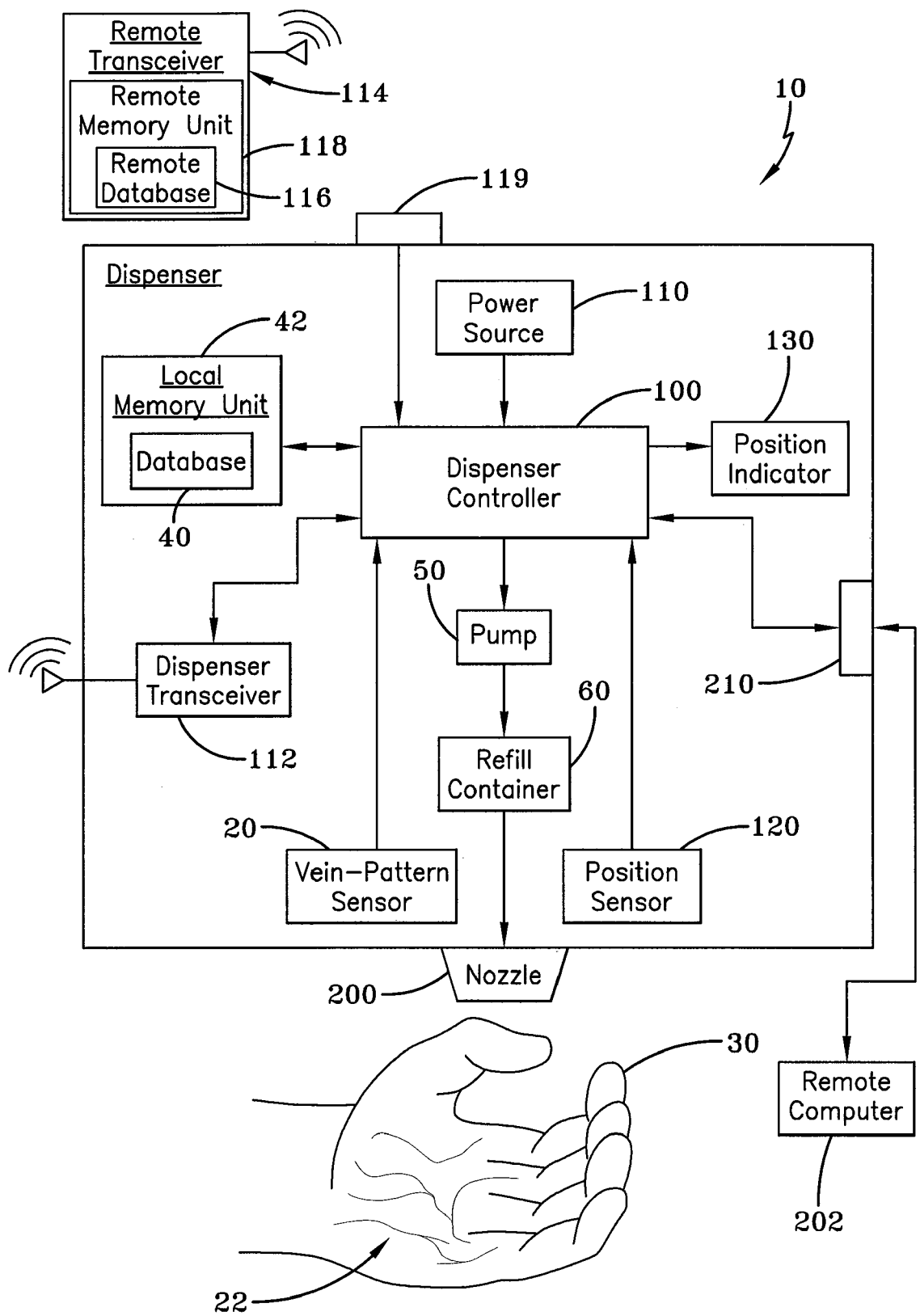
FIG. 1 is a block diagram of a hands-free dispenser that utilizes vein-pattern recognition to identify each user in accordance with the concepts of the present invention.

A touch-free dispenser using a biometric sensor is generally referred to by the numeral 10, as shown in FIG. 1 of the drawings. The dispenser 10 includes a vein-pattern sensor 20 or other biometric sensor that is able to identify a biometric measure of the user, such as the pattern of veins 22 in the hand 30 of a user without the user physically contacting the dispenser 10. For example, the sensor 20 may be configured to detect or identify veins in the palm, as shown in FIG. 1, or in any other part of the user's hand 30. After the vein pattern is detected at the sensor 20, it is compared with a database 40 of predetermined or previously-identified vein-patterns maintained at the local memory unit 42. In one aspect, if the vein pattern matches or is otherwise verified by a previously-stored vein-pattern, then the dispenser 10 is enabled to actuate a pump 50 to dispense material from a refill container 60. In other aspects, the dispenser 10 is enabled to actuate the pump 50 to dispense material from a refill container 60 simultaneously as the vein pattern is detected at the sensor 20 and compared with a database 40 of vein patterns. Thus, in one aspect, the only time constraint in the dispensing of material from the dispenser 10 is that the detecting of the vein pattern 22 by the sensor 20 is completed before the material is dispensed from dispenser 10, although other embodiments are contemplated.

In addition, the dispenser 10 updates usage data stored at the local memory unit 42 that tracks the particular usage habits of various users by comparison of the vein patterns stored in the database 40. It is important to note that the vein patterns stored in the database 40 may be anonymous, that is, not linked to the identity of the user to which the vein pattern belongs, or may be identifiably linked to the user to which the vein pattern belongs, depending on the needs and wants of the organization, facility, manager, etc. using the system. In one aspect, the usage data stored at the local memory unit 42 may comprise the time and location where the dispensements are made, the type of material dispensed, the number of dispenses per dispensing event, and the like. As such, the dispenser 10 provides a sanitary system to enable the dispensing of material, such as soap, without the need to physically contact the dispenser 10, and to track the pattern of usage of the dispenser 10 for each identified vein pattern, which may or may not be linked to an identified user.

Specifically, the touch-free dispenser 10 includes a dispenser controller 100 that may comprise any general purpose or application specific computing device that is configured with the necessary hardware and/or software to carry out the functions to be discussed. The components of the dispenser 10 are energized by a power source 110 that is coupled to the controller 100. In particular, the power source 110 may comprise a mains power source, such as standard commercial power supplied by a wall outlet, or may alternatively comprise a portable power source, such as a battery or solar panel.

Certain embodiments of the system described herein also include the local memory unit 42, which may comprise volatile memory, non-volatile memory, or a combination of both. The local memory unit 42 includes the database 40 that maintains a plurality of predetermined vein-pattern profiles that are associated with users who are being monitored by the dispenser 10. In another aspect, the local memory unit 42 may be portable, allowing it to be selectively inserted and removed from the dispenser 10. For example, the local memory unit 42 may comprise a COMPACT FLASH (CF) memory card, a SECURE DIGITAL (SD) memory card, a MEMORY STICK, or any other portable memory device. As such, the local memory unit 42 may be loaded with the database 40 of vein patterns using a computer system, such as a personal computer, before the local memory unit 42 is inserted into the dispenser 10.

It should also be appreciated that the dispenser 10 may be configured with a suitable dispenser transceiver 112 that communicates with a remote transceiver 114 using wireless networks, such as WI-FI, BLUETOOTH, ZIGBEE, and the like. The remote transceiver 114 includes a remote database 116 maintained by a remote memory unit 118, which allows the dispenser controller 100 to remotely store or retrieve vein patterns and any other usage data therefrom as needed. In one aspect, the dispenser 10 may be configured to store and retrieve vein patterns and associated usage data exclusively at the remote transceiver 114, without the need of the local memory unit 42 and the database 40.

As described above, certain embodiments of the system may include a local memory unit 42 that exists within the dispenser 10. In embodiments of the system including the local memory unit 42, the data read by the sensor 20 in the dispenser 10 is stored at the dispenser 10 in the local memory unit 42, either permanently or temporarily. The data stored at the local memory unit 42 may be transferred for review to a predetermined party that is responsible for reviewing, tracking, or otherwise utilizing the data. The data may be transferred from the local memory unit 42 to the predetermined party by wireless means, or by way of a portable memory device that will transfer the data from the local memory unit 42 to some other viewing apparatus, including a personal or network computer, portable handheld computing device, etc. In other embodiments, the system may include the remote memory unit 118 that exists in a location remote to the dispenser 10, such as, but not limited to, at a central computer system designated for storing information from one or more dispensers. It is foreseen that the dispenser 10 may immediately transfer usage data to the remote memory unit 118 upon detecting of a user's vein pattern, or the dispenser 10 may store a predetermined number of usage entries (i.e. ten entries) or several entries for a predetermined period of time (i.e. all the entries in one day or one week) and transfer the usage data from the dispenser 10 to the remote memory unit per the predetermined criteria for transfer (i.e. once ten entries are accumulated, daily, weekly, etc.). A predetermined party may then access the usage data from one or more dispensers 10 at the central location where the remote memory unit 118 exists or may transfer the usage data from the remote memory unit 118 to another viewing location.

In addition, the dispenser 10 may be configured with a learn mode, which may be selectively initiated. The learn mode may be hardwired into the system or may be selectively initiated by a switch, button 119, or other means coupled to the controller 100, such that when the dispenser 10 fails to match the imaged vein pattern 22 with a previously-stored vein-pattern image in database 40, the imaged vein pattern 22 is added to the database 40. However, when the learn mode is disabled, such as via the button 119, the dispenser 10 does not compare the vein pattern 22 with those stored in the database 40, and proceeds to dispense material from the refill container 60 if any vein pattern 22 is detected. It is also contemplated that the learn mode may also be utilized in other manners, which will be discussed below.

The vein-pattern sensor 20 is also coupled to the controller 100 and is configured to identify the pattern of veins 22 that are present in the hand 30 of a user. In one aspect, the vein-pattern sensor 20 may comprise the vein-pattern sensor described in U.S. Published Appln. No. 2008/0065901 entitled "Biometrics Authentication Method, Media for Individual Authentication, and Biometrics Authentication Device," to Fujitsu Limited and Fujitsu Frontech Limited, which is incorporated herein by reference, although any other suitable vein-pattern sensor may be utilized. In addition to the vein-pattern sensor 20, a positioning sensor 120 and a position indicator 130 are coupled to the controller 100 to detect the proximity of the hand 30 to the dispenser 10 and to provide feedback to the user to ensure that the hand 30 is properly positioned with respect to the vein-pattern sensor 20, so it can be accurately imaged. It is also contemplated that the dispenser 10 may be configured without the positioning sensor 120, while enabling the vein-pattern sensor 20 to provide hand 30 positioning data via the position indicator 130, thus reducing the complexity of the dispenser 10. It should be appreciated that the vein-pattern sensor 20 allows the user to initiate the operation of the dispenser 10 without the need to physically contact the dispenser 10.

Continuing, the positioning sensor 120 may comprise an infrared (IR), laser, capacitive, as well as any other suitable proximity-sensing device, while the position indicator 130 may comprise a speaker; an illuminable device, such as an LED (light emitting diode); or a display to present proximity information to a user. For example, the position indicator 130 may be configured, in the case of an illuminable LED, to change the rate at which it pulses or the intensity of the light illuminated therefrom, based on the relative position of the hand 30 to the dispenser 10. Alternatively, the position indicator 130 may comprise a speaker, which emits a tone or other audible prompt, to indicate the proximity of the user's hand 30 to the dispenser 10. Moreover, in the case of the position indicator 130 configured as a display, it may provide a visual prompt that indicates whether the hand 30 is being positioned in the proper orientation with respect to that of the dispenser 10. Other methods of indicating proper hand position and orientation are foreseen and are not limited by the examples given above.

Furthermore, the controller 100 is also coupled to the pump 50 that is configured to dispense material, such as soap, from the refill container 60 that is selectively installed or removed thereto. As such, when the pump 50 is actuated, material maintained by the refill container 60, is dispensed upon the user's hand 30 via a nozzle 200 maintained by the pump 50. While the present discussion relates to the use of soap, it is also contemplated that the dispenser 10 may be used to dispense any other suitable material, including moisturizer and antibacterial cleanser for example.

It is also contemplated that the dispenser 10 collects and stores at the local memory unit 42 various usage data associated with a particular user whose vein pattern 22 has been detected. For example, the dispenser 10 may associate various usage information with the user's vein pattern 22, such as the dispenser's location, the type of material dispensed (soap, sanitizer, etc.), the serial number of the dispenser, the number of dispensements of material by the dispenser, as well as the time and date that such dispensements occurred. In addition, the dispenser 10 may also associate the particular pattern of usage with the detected vein pattern 22. For example, dispenser 10 may be configured to detect when a user has moved from various regions of a building or other region and can associate this movement with the other information collected when a dispensing event is initiated. It should be appreciated that the collection of such usage data may be performed anonymously, without being associated with a user's vein pattern.

In addition, the usage data may be processed by the dispenser controller 100 into a format that is compatible with a remote computer 202, which may comprise a remote general-purpose or application-specific computing device or computing network, such as a handheld computing device, which may obtain the usage data by a wired connection to a data port 210 that is coupled to the dispenser controller 100. In addition, the collected usage data may also be wirelessly transmitted to any remote general-purpose or application-specific computing device, such as a handheld computing device, via the dispenser transceiver 112. Once the usage data is acquired by the remote computing device, it may be further processed and/or analyzed and/or printed in any desired manner.

Figure 2:
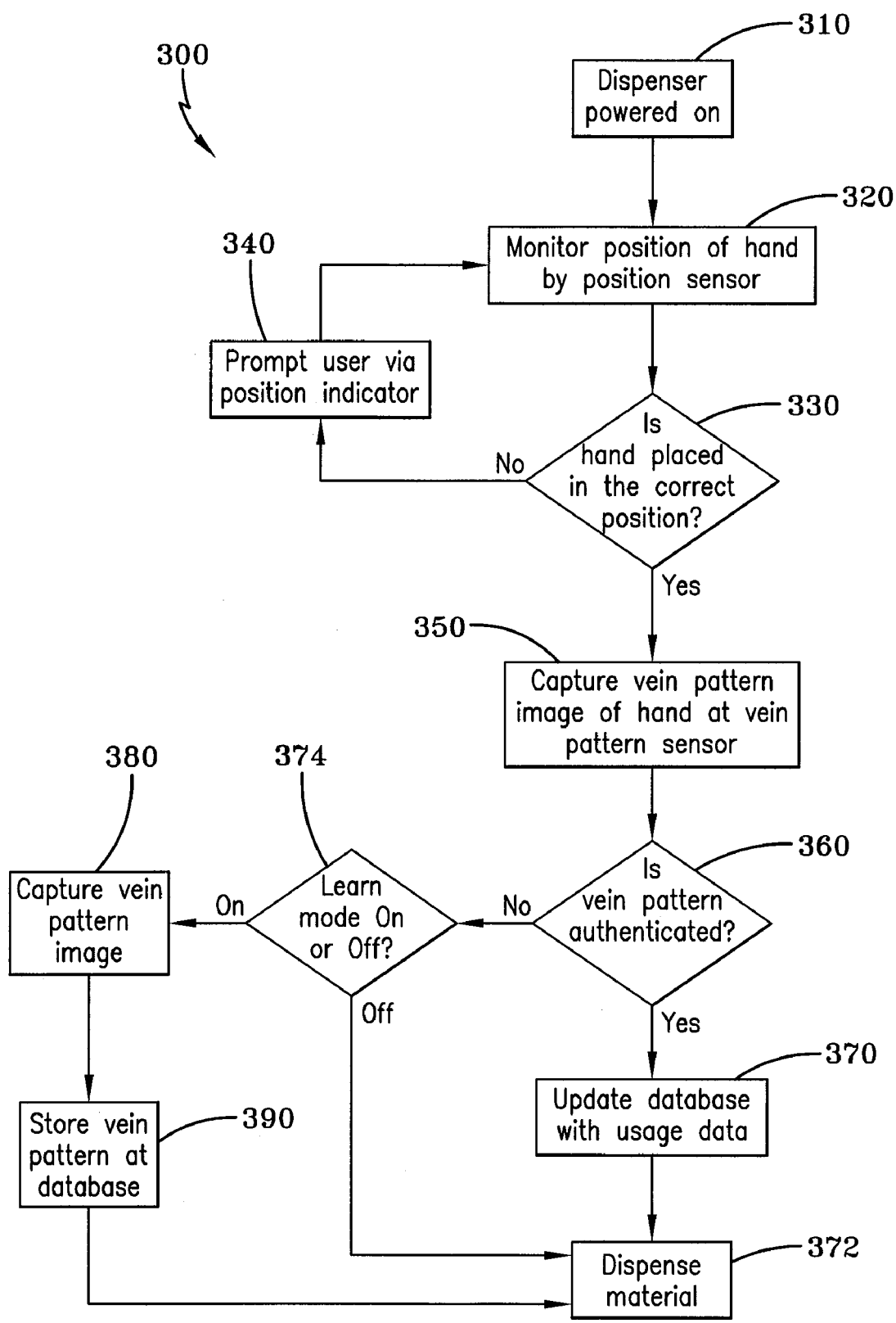
FIG. 2 is a flow diagram showing the operational steps performed by the dispenser that provides a learn mode in accordance with the concepts of the present invention.

Thus, with the structural components of the touch-free dispenser 10 set forth, the operational steps of one aspect of the invention that are associated with employing a user authentication or validation process prior to the dispensement of material is generally referred to by the numeral 300, as shown in FIG. 2 of the drawings. Initially, at step 310 the dispenser 10 is powered on before continuing to step 320, where the position sensor 120 begins monitoring the position of the hand 30 of the user. The dispenser 10 may be automatically powered on when connected to an adequate power source or may automatically power on or "wake" from a sleep mode at the detection of the presence of a user. Somewhat simultaneously with step 320, step 330 is performed to determine if the hand 30 is placed in the correct position relative to the dispenser 10. If the user's hand 30 is not placed in the correct position, then the process continues to step 340, whereby the position indicator 130 provides a visual and/or audible or other prompt to the user to reposition his or her hand 30. Once the user has repositioned his or her hand 30, the dispenser 10 resumes operation via steps 320 and 330. As such, steps 320, 330, and 340 are repeated until the hand 30 is in the correct position to enable an image of the vein pattern 22 of the hand 30 to be captured by the vein-pattern sensor 20, as indicated at step 350. After the unique vein pattern 22 has been captured or imaged, the process continues to step 360, where the dispenser 10 determines whether the vein pattern 22 is authenticated by comparison to previously-acquired vein patterns stored at the database 40. If the vein pattern 22 is authenticated and matches those at the database 40, the process continues to step 370, where the database 40 is updated with various data associated with the usage of the dispenser 10. For example, such usage data may include, but is not limited to, the location of the dispenser 10, the serial number of the dispenser 10, the time and/or date the dispensement occurred, and the number of dispensements of material by the dispenser 10. Somewhat simultaneously with step 370, step 372 is performed, whereby the dispenser 10 proceeds to dispense the material to the user. However, if at step 360 the vein pattern is not authenticated because the imaged vein pattern 22 does not match those stored at either the local memory unit 42 or the remote memory unit 118, the process continues to step 374. At step 374, the process determines whether the learn mode is activated or deactivated via the button 119. As such, if the learn mode is deactivated, the process continues to step 372, where material from the refill container 60 is dispensed. However, if the learn mode is activated, then the process continues to step 380, where the vein pattern 22 of the user's hand 30 are imaged and added to the database 40, as indicated at step 390, thus enabling the dispenser 10 to be operative upon the subsequent identification of the vein pattern 22 of the user's hand 30. Once the user's vein pattern 22 has been added to the database 40, the process continues to step 372, whereupon the dispenser 10 dispenses material from the refill container 60. It is foreseen that in certain embodiments, the dispenser 10 will dispense material from the refill container 60 at step 372 simultaneously as the vein pattern 22 of the user's hand 30 are imaged and added to the database 40 at steps 380 and 390. The dispensing of material at step 372 is not necessarily delayed by the performance of steps 380 and 390 when the learn mode is activated.

Figure 3:
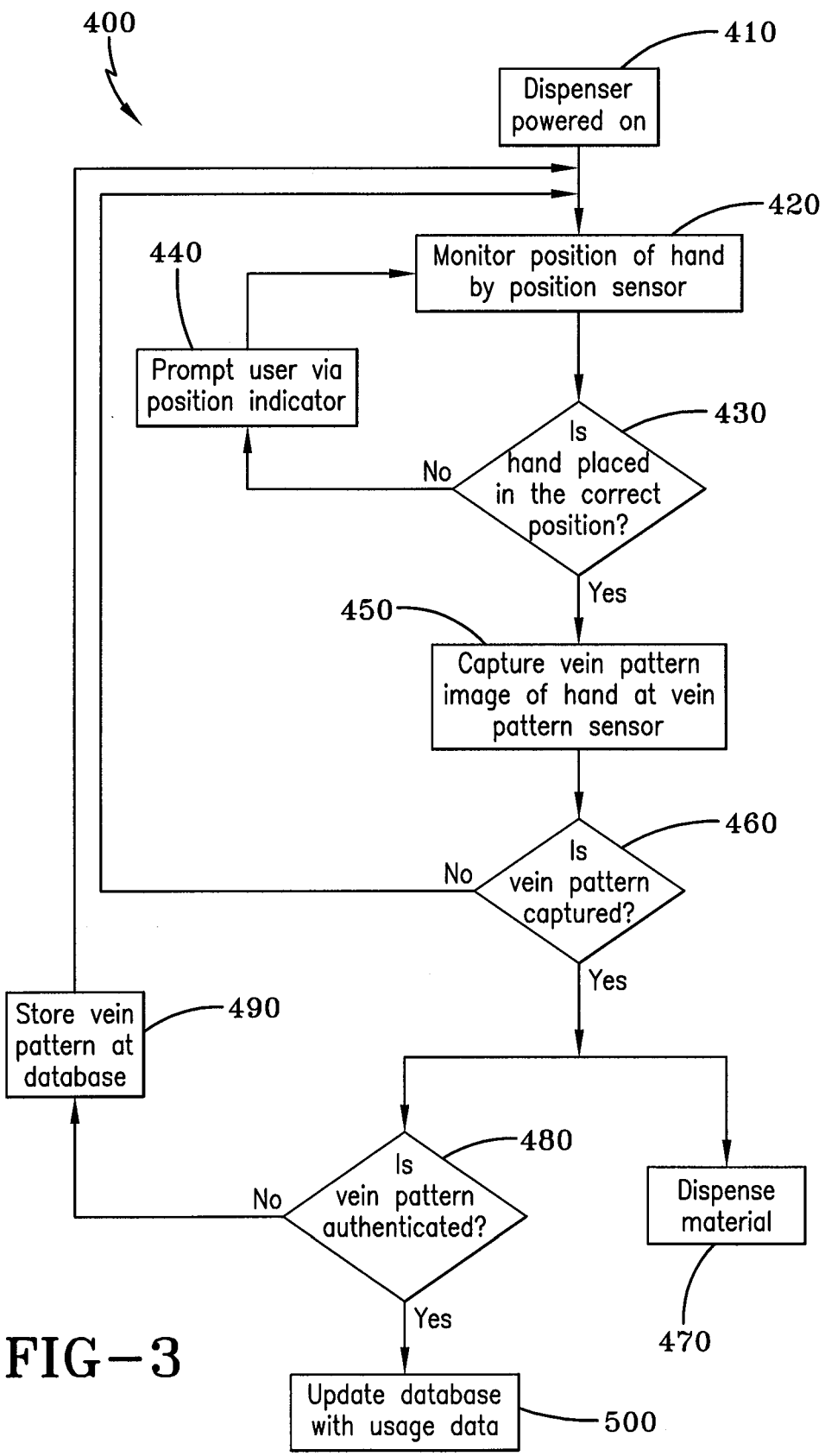
FIG. 3 is a flow diagram showing the operational steps performed by the dispenser when configured to simultaneously authenticate a vein pattern and dispense material upon the capturing of a vein-pattern image in accordance with the concepts of the present invention.

Alternatively, the dispenser 10 may be configured such that the authentication or validation of the user is performed simultaneously with the dispensing of material from the refill container 60, as indicated by the process 400 shown in FIG. 3. Initially, at step 410 of the process 400, the dispenser 10 is powered on before continuing to step 420 where the position sensor 120 begins monitoring the position of the hand 30 of the user. Somewhat simultaneously with step 420, step 430 is performed to determine if the hand 30 is placed in the correct position relative to the dispenser 10. If the user's hand 30 is not placed in the correct position, then the process continues to step 440, whereby the position indicator 130 provides a visual and/or audible prompt to the user to reposition his or her hand 30. Once the user has repositioned his or her hand 30, the dispenser 10 resumes operation via steps 420 and 430. As such, steps 420, 430, and 440 are repeated until the hand 30 is in the correct position to enable an image of the vein pattern 22 of the hand 30 to be captured by the vein-pattern sensor 20, as indicated at step 450. Once step 450 is completed, the process 400 continues to step 460, whereby the dispenser 10 determines whether the vein-pattern image has been captured, such that if the vein pattern 22 has not been captured, the process returns to step 420. However, if at step 460 the dispenser 10 determines that the vein-pattern sensor 20 has captured an image of a vein pattern 22, the process 40 dispenses material from the refill container 60 at step 470. Simultaneously with step 470, the process 400 also performs the authentication or validation of the imaged vein pattern 22 at step 480, such that if the vein pattern 22 is not authenticated, the vein pattern is automatically stored at the database 40, as indicated at step 490. However, if the dispenser 10 does authenticate the imaged vein pattern 22 as being one previously stored at the database 40, then the process 400 continues to step 500, where the data record associated with the vein pattern 22 is updated with the particular usage data, as previously discussed. As such, the process 400 does not require the authentication of a user prior to the dispensements of material from the dispenser 10, which is desirable when the collected and stored vein patterns are being anonymously maintained, such that they are not associated with a specific individual, thereby allowing usage data to be collected and cumulatively associated with each stored vein pattern.

Figure 4:
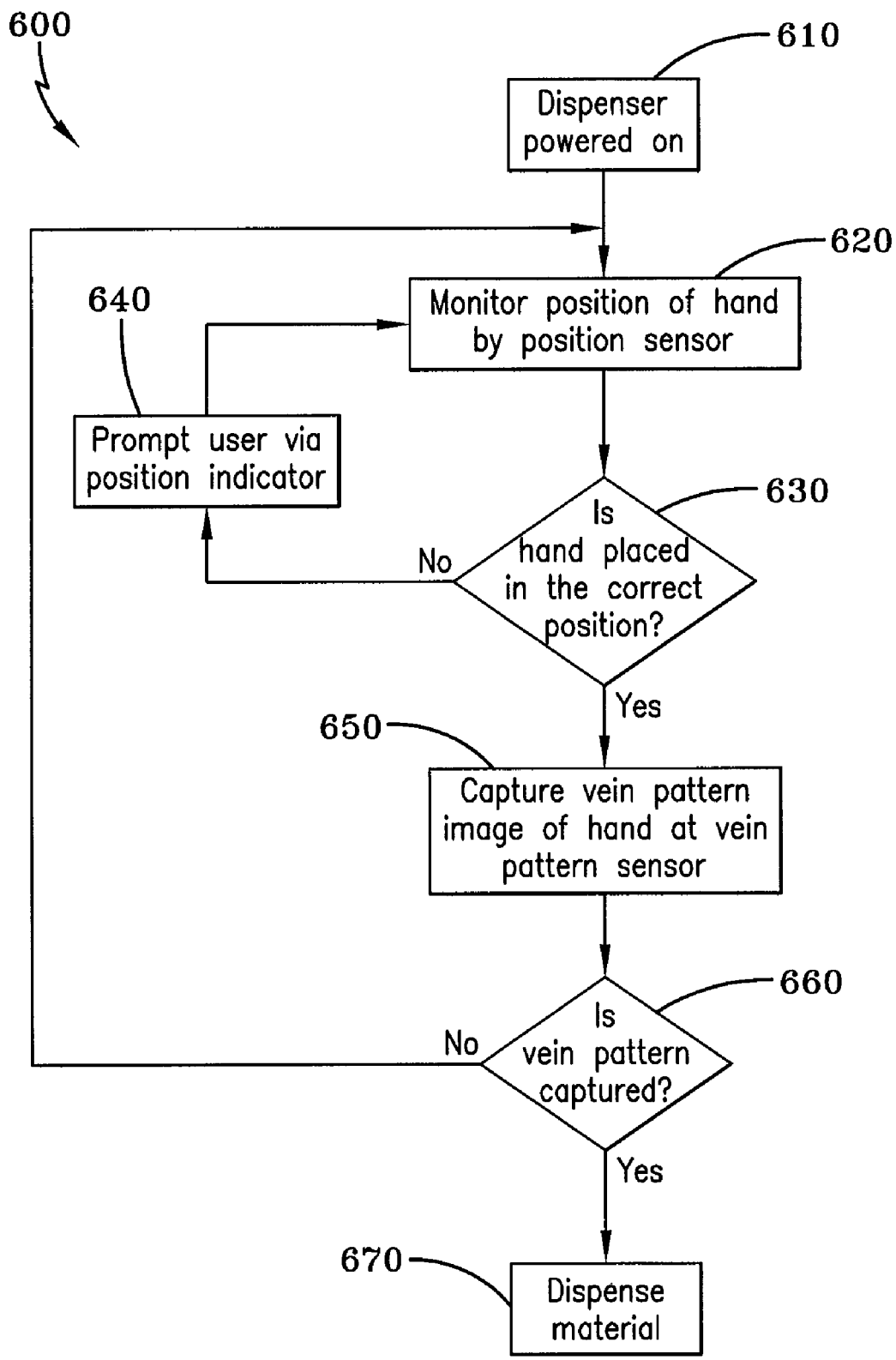
FIG. 4 is a flow diagram showing the operational steps performed by the dispenser when configured to dispense material upon the capturing of a vein-pattern image in accordance with the concepts of the present invention.

In yet another embodiment, the dispenser 10 may be configured whereby it dispenses material from the refill container 60 upon the detection of a vein pattern 22, without any authentication, as indicated by the process 600 shown in FIG. 4. Initially, at step 610 of the process 600, the dispenser 10 is powered on before continuing to step 620 where the position sensor 120 begins monitoring the position of the hand 30 of the user. Somewhat simultaneously with step 620, step 630 is performed to determine if the hand 30 is placed in the correct position relative to the dispenser 10. If the user's hand 30 is not placed in the correct position, then the process continues to step 640, whereby the position indicator 130 provides a visual and/or audible prompt to the user to reposition his or her hand 30. Once the user has repositioned his or her hand 30, the dispenser 10 resumes operation via steps 620 and 630. As such, steps 620, 630, and 640 are repeated until the hand 30 is in the correct position to enable an image of the vein pattern 22 of the hand 30 to be captured by the vein-pattern sensor 20, as indicated at step 650. Once step 650 is completed, the process 600 continues to step 660, whereby the dispenser 10 determines whether the vein-pattern image has been captured or identified, such that if the vein pattern 22 has not been captured or identified, the process returns to step 620. However, if at step 660 the dispenser 10 determines that the vein pattern sensor 20 has captured an image of a vein pattern 22, the process 40 dispenses material from the refill container 60 at step 670. If the vein pattern 22 is not imaged, then the process 600 returns to step 620, as previously discussed. As such, the process 600 enables the dispenser to dispense material from the refill container 60 as long as a vein pattern 22 is detected, without regard to whether the imaged vein pattern 22 is stored at the controller 100.

As such, the dispenser 10 provides an accurate and convenient manner in which material, such as soap, is dispensed to a user without physically contacting the dispenser 10 directly. Furthermore, the biometric-identification and data-tracking features of the dispenser 10 enable the dispenser to uniquely identify each user based on the vein pattern of his or her hand and to associate such data with information that characterizes the user's interaction with the dispenser 10. This collected data is then used during subsequent analysis to determine whether individual users are complying with predetermined hygiene standards, as well as other various criteria. Moreover, the dispenser 10 can be utilized such that imaged vein patterns are used only to initiate the dispensing of material from the dispenser 10 without disclosing an individual's identity. As such, the dispenser 10 provides an increased level of anonymity, while still enabling the general collection of usage data and dispensing of material upon the detection of any vein pattern.

Therefore, one advantage of the present invention is to provide a dispenser that is actuated in a touch-free manner, without physical contact with the dispenser, in order to dispense material from a refill container. Another advantage of the present invention is to provide a touch-free dispenser, which identifies and tracks each user's usage of the dispenser based on the vein pattern of the user's hand.

Although the present invention has been described in considerable detail with reference to certain embodiments, other embodiments are possible. Therefore, the spirit and scope of the appended claims should not be limited to the description of the embodiments contained herein.

What is claimed is:

1. A touch-free dispenser for dispensing material from a refill container into a user's hand comprising:
   a controller;
   a pump coupled to said controller, said pump configured to receive the material from the refill container;
   a local memory unit coupled to said controller, said local memory unit adapted to maintain at least one vein pattern; and
   a vein-pattern sensor coupled to said controller, said vein-pattern sensor configured to detect at least a portion of the vein pattern within the user's hand without contact therewith;
   wherein said controller activates said pump to dispense the material from the refill container when said vein-pattern sensor detects at least a portion of the vein pattern of said user's hand.

2. The touch-free dispenser of claim 1, wherein said controller generates usage data when the material is dispensed.

3. The touch-free dispenser of claim 2, wherein said usage data is associated with said detected vein pattern.

4. The touch-free dispenser of claim 3, further comprising a dispenser transceiver coupled to said controller to wirelessly communicate said detected vein patterns and said usage data with a remote transceiver.

5. The touch-free dispenser of claim 1, wherein said local memory unit is removable from said controller.

6. The touch-free dispenser of claim 1, further comprising a learn button coupled to said controller to selectively activate or deactivate a learn mode, wherein when said learn mode is activated and said detected vein pattern does not match said at least one stored vein pattern, said pump is activated to dispense the material and said controller stores the detected vein pattern at said local memory unit, and when said learn mode is not activated, said pump is activated to dispense the material when said vein pattern sensor detects any vein pattern.

7. The touch-free dispenser of claim 1, further comprising a position sensor and a position indicator each coupled to said controller, wherein said position indicator generates a prompt based on the position of the user's hand with respect to said position indicator.

8. The touch-free dispenser of claim 1, further comprising a data port coupled to said controller to transfer said usage data from said controller to a remote computer.

9. A touch-free dispenser for dispensing material from a refill container into a user's hand comprising:
   a controller;
   a pump coupled to said controller, said pump configured to receive the material from the refill container; and
   a vein-pattern sensor coupled to said controller, said vein-pattern sensor configured to detect at least a portion of the vein pattern within the user's hand without contact therewith;
   wherein said controller activates said pump to dispense the material from the refill container if said vein-pattern sensor detects at least a portion of a vein pattern in the user's hand.

10. The touch-free dispenser of claim 9, further comprising:
    a local memory unit coupled to said controller, said local memory unit adapted to maintain at least one predetermined vein pattern;
    wherein upon the detection of said vein pattern, said controller authenticates the detected vein pattern.

11. The touch-free dispenser of claim 10, wherein said controller generates usage data when the material is dispensed.

12. The touch-free dispenser of claim 11, wherein said usage data is associated with said detected vein pattern.

13. The touch-free dispenser of claim 12, wherein the detected vein pattern and said usage data is stored at a local memory unit coupled to said controller if said vein pattern is not authenticated.

14. The touch-free dispenser of claim 13, wherein said local memory unit is portable and removable from said controller.

15. The touch-free dispenser of claim 12, further comprising a dispenser transceiver to wirelessly communicate said vein patterns and said usage data with a remote memory unit maintained by a remote transceiver.

16. The touch-free dispenser of claim 9, further comprising a position sensor and a position indicator each coupled to said controller, wherein said position indicator generates a prompt based on the position of the user's hand with respect to said position indicator.

17. A method of dispensing material in a touch-free manner comprising:
    providing a dispenser having a vein-pattern sensor;
    coupling a refill container in operative communication with said dispenser, said refill container maintaining a quantity of material;
    placing at least one hand in proximity to said vein-pattern sensor, without making contact with said vein-pattern sensor, such that placement of the user's hand activates the vein-pattern sensor; and
    dispensing said material from said refill container if a vein pattern within the user's hand is detected by said vein-pattern sensor.

18. The method of claim 17, further comprising:
    generating usage data based on said dispensing step; and
    storing said usage data in a database maintained by said controller.

19. The method of claim 17, further comprising:
    comparing said detected vein pattern with a database of at least one predetermined vein pattern maintained by said controller; and
    performing said dispensing step if said detected vein pattern matches said at least one predetermined vein pattern.

20. The method of claim 19, further comprising:
    entering a learn mode to store said detected vein pattern at said database if said vein pattern image and said at least one predetermined vein pattern do not match.

21. The method of claim 19, further comprising:
    generating usage data based on said dispensing step; and
    associating said usage data with said detected vein pattern at said database.

22. The method of claim 18, further comprising:
    reviewing said usage data from said database.

23. A dispenser for dispensing material from a refill container into a user's hand comprising:
    a controller;
    a vein-pattern sensor coupled to said controller, said vein-pattern sensor configured to detect a vein pattern within the user's hand without contact therewith; and
    a pump coupled to said controller, said pump configured to receive the material from the refill container so as to dispense the material when said vein-pattern sensor senses the vein pattern in the user's hand, regardless of whether said vein-pattern sensor has previously sensed the vein pattern of the same user's hand, and further wherein said vein pattern is maintained by said controller anonymously, such that it is not associated with the user's identity.

24. The touch-free dispenser of claim 23, wherein said controller generates usage data when the material is dispensed.

25. The touch-free dispenser of claim 24, wherein said usage data is associated with said detected vein pattern.

26. The touch-free dispenser of claim 24, further comprising a dispenser transceiver coupled to said controller to wirelessly communicate said detected vein pattern and said usage data with a remote transceiver.

* * * * *